United States Patent [19]

Eckels

[11] 4,419,982

[45] Dec. 13, 1983

[54] MAGNETIC EDGE SEAL FOR SOLAR COLLECTOR FILM

[76] Inventor: Robert E. Eckels, 2101 Youngfield, Golden, Colo. 80401

[21] Appl. No.: 376,297

[22] Filed: May 10, 1982

[51] Int. Cl.³ .............................................. F24J 3/02
[52] U.S. Cl. .................................. 126/426; 126/450; 160/120
[58] Field of Search ............... 126/417, 426, 429, 431, 126/432, 434, 450; 160/120; 165/46, 47, 53, 54, 55

[56] References Cited

U.S. PATENT DOCUMENTS

| | | | |
|---|---|---|---|
| 2,931,578 | 4/1960 | Thompson | 126/429 |
| 3,860,055 | 1/1975 | Wild | 126/431 |
| 3,960,135 | 6/1976 | Angilletta | 126/450 |
| 3,990,635 | 11/1976 | Restle et al. | 126/441 |
| 4,002,159 | 1/1977 | Angilletta | 126/429 |
| 4,020,826 | 5/1977 | Mole | 126/449 |
| 4,054,125 | 10/1977 | Eckels | 126/449 |
| 4,237,956 | 12/1980 | Sivin et al. | 160/120 |
| 4,257,477 | 3/1981 | Maloney | 126/426 |
| 4,287,683 | 9/1981 | Louwenaar | 52/202 |
| 4,301,787 | 11/1981 | Rice | 126/429 |

Primary Examiner—Daniel J. O'Connor

Attorney, Agent, or Firm—James E. Pittenger

[57] ABSTRACT

An edge seal for a solar collector type flexible film material is provided for forming a generally air-tight heat insulating reusable seal around the edge of an opening in the surface of a building structure. The edge seal is formed around the film material which is sized to cover the window opening and overlap the edges of the opening. A band of magnetically permeable particles is adhered along the edge of the substrate forming the film material by a suitable adhesive. A strip of magnetic material is adhered around the edge of the opening. The permeable particles are attracted to the magnetic strip to form an effective air-tight seal between the flexible film material and the opening to essentially form a dead air space between the flexible material and the window opening. The flexible film material can be mounted similar to a window shade adjacent to the upper edge of the opening. The film material can also have a monolayer of transparent spheres adhered to one side which provide a means for concentrating solar energy striking the outer surface of the sheet material. The solar energy will be converted to heat energy and conducted through the sheet material to the interior surface so that the heat will be transferred to the interior of the building.

1 Claim, 4 Drawing Figures

MAGNETIC EDGE SEAL FOR SOLAR COLLECTOR FILM

FIELD OF THE INVENTION

This invention is directed to an edge seal and a method of producing an edge seal for a solar collector type of flexible film which covers a structure opening. It is more specifically directed to a magnetic type of edge seal for a window shade having a monolayer of optical spheres adhered to a flexible substrate used for covering a window opening.

BACKGROUND OF THE INVENTION

In the past I have described various ways for producing a flexible solar collector material which has a plurality of glass spheres adhered to one surface of the substrate. In U.S. Pat. No. 4,033,324 which issued on July 5, 1977, I described an arrangement for mounting a plurality of focusing elements on a solar energy absorbing substrate. The elements focus solar energy rays into a series of hot spots focused on the surface of the substrate which provides a high temperature for transfer of the heat energy to the opposite side of the substrate material.

In U.S. Pat. No. 4,054,125 I describe an arrangement whereby a dark colored absorbing substrate covered with the monolayer of the transparent spheres is provided for absorbing solar radiation for heating an air column formed between the substrate and the inside of a transparent window. In one form of this invention a drapery material forms with the substrate a series of tubes for naturally or forcibly circulating warm air through the tubes when the substrate is heated by solar radiation. Reflecting cover material, selectively mountable in front of the monolayer substrate, reflects solar radiation back through the transparent window when heating is not required.

My presently pending patent application Ser. No. 224,630 describes a unique method for forming a stable, monolayer of transparent spheres on a sheet-like substrate by flowing a stream of spheres in a cascading arrangement over the sloped surface of the substrate material coated with a suitable adhesive. The spheres which adhere to the substrate material, are then set by either applying light pressure or the application of a thin film of clear transparent material. This provides a novel substrate material having a fairly complete cover of uniform sized glass spheres adhered to one side of the surface of the material to form the solar concentrating function.

When the material which is formed by this method is utilized in the fabrication of window covers or shades, it performs a very useful function. When in the drawn position, the solar energy which impinges on the outer surface of the shade heats the inside surface of the substrate film which in turn heats the air next to the film causing the heated air to rise by convection. In addition, heat energy is also radiated into the room directly by the heated interior surface of the substrate film. In this way, solar energy is transformed into heat energy which is utilized for heating the interior of a room or other enclosed area.

In the use of this material, it has been found that a considerable increase in the efficiency of the device can be obtained by sealing the edge of the shade along all edges of the window in order to trap the cold air next to the window forming an insulating factor and preventing the cold air from escaping into the interior of the room. With this arrangement the seal becomes very effective during the night time hours.

As can be expected, there are many difficulties in attempting to seal the edges of a window shade of this type. One of these is the necessity to be able to raise and lower the shade at will. In order to do this, it is necessary to be able to quickly and easily release the bottom and side edges of the window shade as desired when it is necessary to raise or lower the shade. It is also necessary that the seal for this type of device be easily released or attached so that by merely raising and lowering the shade and putting it in place the seal can be made or broken.

In the past it has been attempted to use a slotted channel on each side of the shade to hold and retain the edges of the shade in close proximity to the window frame to form a quasi air-tight seal. As can be readily expected if the channel is very narrow, it is difficult to move the shade. With this hindrance, it makes it difficult to use the shade with the final result that the shade is either pulled from the channels or the sides are cut or torn rendering any seal useless. In addition, the bottom of the shade is seldom properly retained, or if it is it is by use of a mechanical seal or lock which usually is very cumbersome and difficult to use.

The present invention solves all of these problems by rendering a very quick and easy seal which is completely or is substantially air-tight when in place. When combined with a solar collector type device, unique and gratifying results are obtained with the applicant's invention.

PRIOR ART STATEMENT

The following is a brief discussion of the most pertinent patents of which the inventor is aware. This is not intended as a complete discussion of these patents and reference should be made to the patents themselves for a determination of their disclosure.

The Angelita patent (U.S. Pat. No. 3,960,135) discloses a combination window solar heater and thermal barrier. This patent discloses a vertically-oriented, highly heat absorbant surface within a box which has been mounted within the frame of a window. The construction of the box provides a flexible gasket seal around the outside edges of the window frame to seal the air space within and control the movement of air flow through the box by convection heating. Pivotally mounted doors are provided on the interior surface of the box to allow the heated air within that box to flow to the interior of the adjacent room.

The patent to Robert A. Mole (U.S. Pat. No. 4,020,826) shows another window solar energy system in which a radiant energy absorbing drapery is mounted adjacent to the interior surface of a window. This drapery can be reversed so as to reflect the solar energy, if desired. The drapery is mounted with a space between the drapery and the window sash to allow air circulation to be provided by convection heating.

The Restle, et al. patent (U.S. Pat. No. 3,990,635) describes a solar collector for a window opening which includes two transparent substrate film sheets stored on rollers such as a window shade. The edges of this film material move in slots provided on each side of the window sash to provide a seal along both sides of the film. Since this slot can not have a close tolerance, it is obvious that air flow around the edges of the film can occur.

SUMMARY OF THE INVENTION

This invention is directed to a solar energy absorbing system for use with an opening provided in the exterior surface of a structure. The solar collector sheet material forming the basis for the system includes a flexible substrate film having a monolayer of transparent beads adhered along one surface. The collector material is arranged to be mounted on a retractable roller provided at the upper edge of the window opening.

The collector material which is utilized in the fabrication of this device utilizes a multitude of glass or plastic spheres which are adhered to the surface of the substrate film and arranged so that solar energy striking the spheres will be concentrated optically onto the surface of the substrate. The conversion of the solar energy takes place in the substrate where the solar energy is changed to heat energy and this heat is transferred to the interior surface of the film by conduction.

Since considerable heat energy is lost through or around a window or building opening, it is desirable to seal the edges of the collector material around the space adjacent to the window. In this way, a dead air cavity can be provided between the window and the substrate film so that the air is trapped between these elements to produce an insulator to reduce actual heat loss from the room.

In order to accomplish this arrangement in a simple and low cost structure the collector film material can be mounted and operated in a manner similar to a window shade. This shade arrangement is attached along one edge to a wood or metallic roller which is supported at each end by suitable brackets. By grasping the edge of the film material, it can be pulled down across the window opening as it is unrolled from the roller. In this way, the film can be positioned over the window opening or wound back onto the roller to expose the window as desired.

During manufacture of the collector material, the surface of the film is coated with a suitable adhesive and the film is mounted on a support surface in a generally vertical position. A quantity of transparent glass or plastic spheres of suitable size and optical quality is cascaded over the surface of the film starting at the uppermost edge. The application of the glass spheres can be performed either manually or by machine as desired during this portion of the manufacturing process. It is desirable that these spheres shall not be embedded more than one-third of their height in the adhesive coating. It has been found that this depth can be controlled by carefully adjusting the angle of the surface with the vertical plane.

In accordance with the present invention, prior to the application of the glass spheres to the adhesive, a cover strip is applied around the outside edges of the film sheet so as to cover the adhesive in this area. With the cover strip applied, the glass spheres are prevented from adhering to the protected edge areas. After the transparent spheres have been applied, the protecting strips are removed and a granular or powdered magnetically permeable or attractable material is applied to the exposed adhesive area. The particle size can be from as little as 10 microns to particles as large as 1/16th of an inch or more in average diameter. It is desirable, however, that the approximate size of the particles be similar to the optical units or transparent spheres which are adhered to the surface of the substrate film. This is helpful in order to maintain a balance between the energy absorbing surface and the edges to prevent difficulty in the winding of the material when used as a window shade. These particles are fabricated from iron or other suitable ferrous materials which are attracted to magnets and other magnetic devices.

The applied magnetically permeable particles are set into the adhesive by applying a light force with a soft roller. It is also possible that a clear plastic or other type of coating can be applied to the particles to seal their surface. This sealing coat may be necessary where there is a considerable amount of moisture in the ambient atmosphere to prevent the iron or ferrous particles from oxidizing and forming a rust byproduct.

In order to form the other half of the seal a plurality of short strips of magnetic material is adhered to the edge of the window frame along both sides. In the alternative a continuous strip of magnetic material can be applied along both edges of the window frame. The width of the substrate material which forms the solar collector shade is arranged to overlap the edge of the window frame and the magnetic strip material which is applied thereto. In this way when the collector material is drawn down across the window opening and positioned adjacent to the frame, the iron particles will be attracted to the magnetic strips forming a generally tight seal which prevents air flow around the edges of the material.

As an additional embodiment of the present invention, when a steel casement window is encountered, it is possible that the edge strip along the material can be formed from small magnetic particles which are embedded in the adhesive. In this way the magnetic particles can be attracted directly to the iron or steel material in the edge of the window sash or frame forming a seal between the film material and the window structure directly.

It is also within the scope of this invention that the iron or magnetically permeable particles can be embedded along the end of the film adjacent to the bottom of the window opening. In the same way the magnetic strip material can be adhered along the bottom edge of the window opening or on the sill so that this edge of the substrate can also be sealed.

As can be envisioned, it is relatively simple to separate the film from the magnetic edge strip along the window opening by merely pulling out on the bottom edge which will separate the film from the magnetic strip. In this way, the material can be retracted onto the roller to expose the window and for storage of the film. It is also possible to mount the shade roller on brackets which have horizontal slots available for support of the ends of the roller. In this way the roller can move toward or away from the upper edge of the window opening so that once the material has been unrolled and sealed the roller itself can be moved by any type of spring or biasing device into contact with the upper edge of the window. In this way, the upper edge of the cavity between the window and the film is also sealed. It is to be understood that the storage roller must be able to move freely so that it can easily rotate to allow the film to be unrolled or rolled as desired.

A seal as described herein is quite convenient due to the fact that when the solar collector film is in place and if a person would like to look through the window, the film can be easily pulled away from the side edge of the window and then replaced, when desired.

During the manufacture of the magnetic edge seal it is possible to use the particle cascade process which has been described previously for the solar collector material. With this process the thickness of the layer of iron or other magnetically permeable particles can be controlled which is a function of the angle of contact of the particles with the adhesive coated substrate. The use of this process for applying the particles will provide an even consistency and constant thickness to this strip.

Any type of pliant, thin film material can be utilized for the substrate of the solar collector material. This film can be a thin plastic sheet, such as Mylar or, if desired, a thin metallic material can be used for this purpose. An acrylic, non-hardening coating of adhesive can be applied to the substrate for adhering the transparent spheres and the magnetically permeable particles to the surface of the film. The adhesive coating is intended to have a thickness of approximately one to three mils. The magnetically permeable particles which can be utilized in forming the edge sealing strip material can be iron or any other ferrous material which will be drawn to and held by the magnetic strips.

BRIEF DESCRIPTION OF THE DRAWINGS

Other features of this invention will appear in the following description and appended claims, reference being made to the accompanying drawings forming a part of the specification where like reference characters designate corresponding parts in the several views.

DETAILED DESCRIPTION OF THE INVENTION

Figure 1:
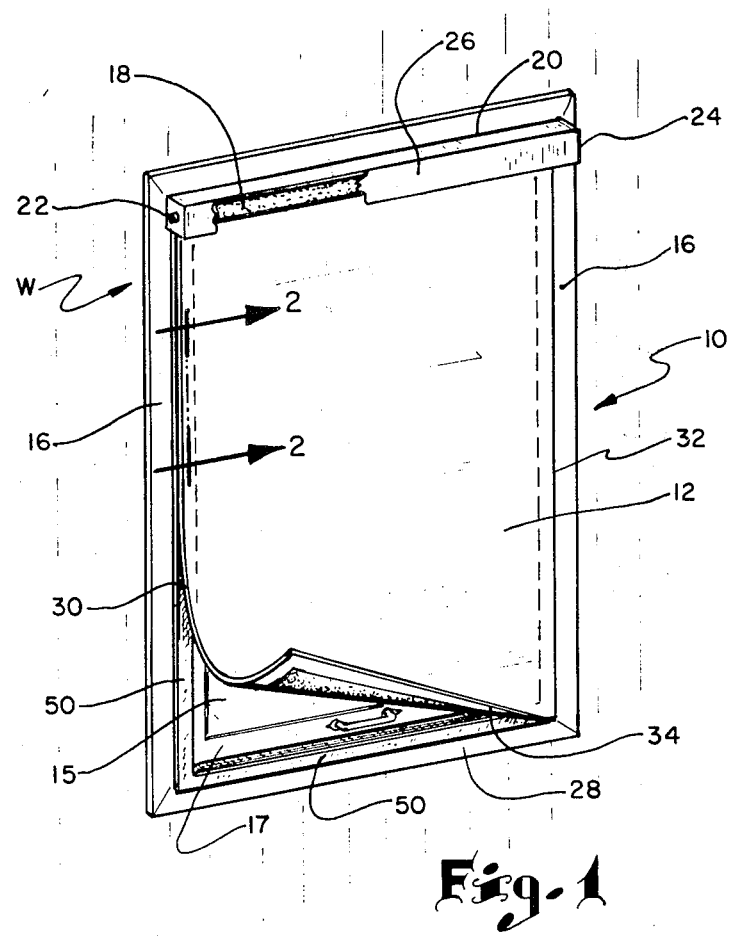
FIG. 1 is a perspective view showing a window opening covered by the solar energy collecting material having the edge strip seal provided according to the present invention.
Figure 2:
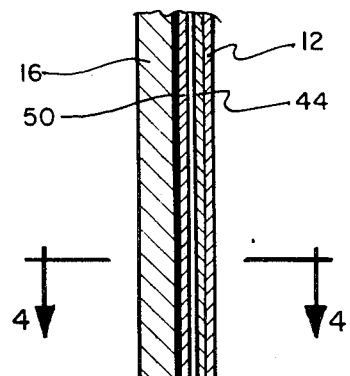
FIG. 2 shows a cross section of the substrate material through the edge seal of the device.
Figure 3:
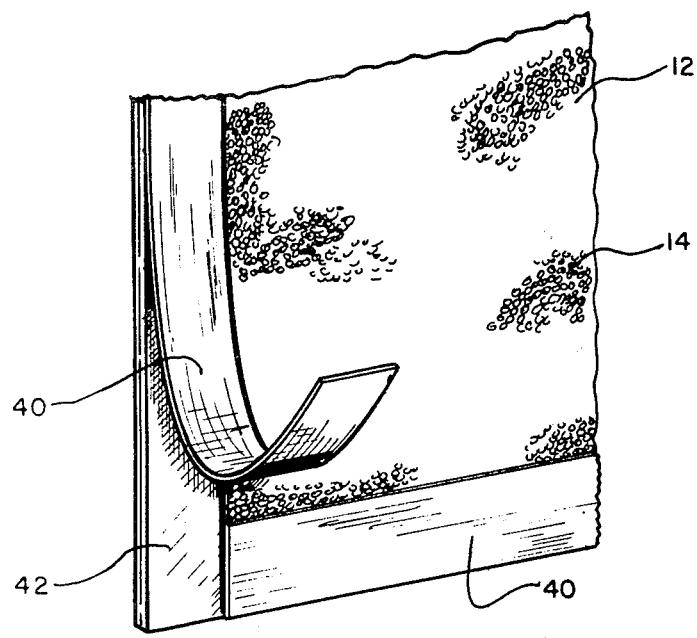
FIG. 3 shows the substrate material during manufacture with the protective strip pulled back to expose the protected adhesive coating along the edge.
Figure 4:
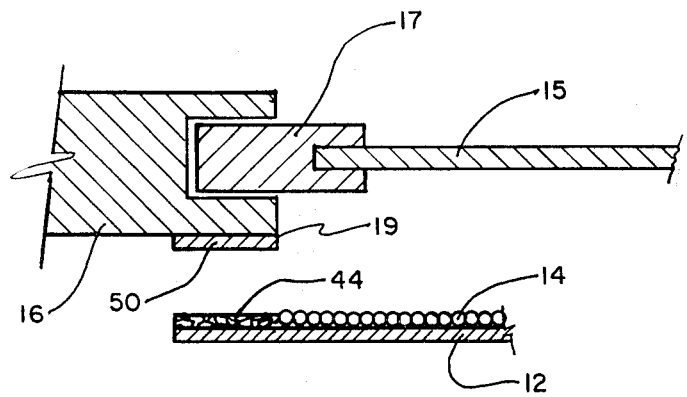
FIG. 4 is a partial cross section taken along lines 4—4 of FIG. 2 which shows the substrate edge seal material in position adjacent to the magnetic strip attached to the edge of the window frame.

Turning now more specifically to the drawings, FIG. 1 shows a common window opening W mounted in the wall of a building structure. A solar collector window shade 10 is mounted so as to cover the window opening W. The shade 12 is formed from a suitable flexible film material which is covered on the surface closest to the window by a monolayer of transparent glass or plastic spheres 14. The film 12 is arranged to have a sufficient width to overlap the side edges of the window frame 16 by at least one-half inch or more.

The shade 12 is wound on a suitable roller 18 which is rotatably mounted at the upper edge 20 of the window frame 16. Suitable brackets 22, 24 are mounted at the ends of the roller 18 to allow the roller to rotate under a spring biased force to wind up and store the film 12 after it has been extended. As is commonly known, it is also possible to provide a release latch in the windup, spring biasing mechanism. A suitable cover or box 26 can be provided to enclose the rolled shade 12 to provide an aesthetically pleasing appearance to the shade when in the stored condition.

In addition to improving the appearance of the shade the cover can also have a practical benefit as well. A longitudinal slot is provided along the edge closest to the window frame so that the film can extend through this slot as it is drawn down across the window opening or retracted onto the roller. The cove 26 is flush mounted at the upper edge 20 of the opening so that its bottom edge is even with the inside edge of the frame 16 to provide a generally air tight seal along the top.

The shade 12 when needed can be drawn from the roller 18 and pulled down to extend beyond the window opening 15 so as to overlap the lower portion 28 of the frame 16.

With an edge seal according to the present invention, it is possible to trap or enclose the volume of air adjacent to the window pane 15 so that this cold air cannot enter and circulate through the interior of the room. On the other hand, this arrangement also prevents heat in the room from escaping through the window opening providing an insulating factor.

The monolayer of transparent spheres 14 which are adhered to the surface of the collector material 12 act as optical concentrators which focus the solar energy onto the surface of the substrate where the solar energy is directly converted into heat energy. By heat conduction and transfer this energy is dissipated by conversion to the air and radiated from the surface of the shade 12 which is facing the room.

The edge seal according to the present invention is used in combination with the shade material 12 to seal the side edges 30, 32 and bottom edge 34. As can be expected, it is desirable to have an easily releasable seal at these locations so that the shade can be either drawn or partially drawn onto the roller 18 when desired or the side edge of the shade can be released to allow the user to observe the outside conditions.

This invention relates to a new and novel magnetic edge seal for a shade as described above. If a solar collector shade as described in my U.S. Pat. No. 4,054,125 is provided, it is fabricated from a suitable flexible, plastic film substrate such as Mylar, polyvinylchloride (PVC) or a woven material utilizing fiberglass which can be coated with Teflon, PVC, silicone, or urethane. To provide the heat absorbing and transfer characteristics, one side of the substrate is coated with a metallic heat reflecting coating while the opposite side has a black or dark surface for absorbing heat energy.

During manufacture of the collector material a thin coating of adhesive material which may be a tacky plastic monomer or polymer such as urethane which cures into a polymeric material may be used. As an alternative, an adhesive coating of a nondrying material such as acrylic, may also be utilized. A monolayer of optical quality spheres of glass or clear transparent plastic and having a size range within 0.5 to 1700 microns is then applied to the adhesive coating.

A novel process for applying the transparent spheres to the surface of the substrate has been found. After the surface of the substrate has been coated with the adhesive material, it is mounted on a flat surface which can be arranged in a variable angular position from vertical to approximately 45°. A release or cover strip the width that is desired for the edge seal is applied around the edge of the substrate material at least along the side edges and along one end. The width of the release strip covering the adhesive material along the edges of the substrate can be of any width desired but usually falls within the range of one-half to one inch. With the edges protected and the substrate film mounted on the generally vertical surface, the transparent spheres are applied to the adhesive coating on the substrate by allowing them to cascade from the uppermost edge downwardly across the surface. In this way a single layer or monolayer of transparent spheres is applied to the surface of the substrate so as to be only partially embedded in the adhesive coating and yet essentially covering the entire surface of the adhesive. It has been found that a high percentage of the surface can be covered by this process and the depth that the spheres penetrate into the surface of the adhesive can be carefully controlled. It is essential that no more than one-third of the height of the spheres be coated with the adhesive to provide the energy absorbing characteristics.

Once the spheres have been applied to the surface of the substrate, the release strips 40 are carefully removed. With the release strips 40 removed from the edge of the material 12 the tacky adhesive coating 42 is exposed. In a manner similar to the application of the transparent spheres, magnetically permeable particles 44 are allowed to cascade downwardly across the edge surfaces of the substrate 12 so as to contact and adhere to the adhesive material. The magnetically permeable particles can be iron powder or any other suitable material which is readily attracted to magnetic material or other sources of magnetic flux. The magnetic particles can range in size from 10 microns to as large as one-sixteenth of an inch or more in average diameter. It is important, however, that the size of the particles be kept in balance with the size of the optical units so as to prevent an imbalance in the winding of the shade 12 onto the roller 18.

Once the iron or other magnetically permeable particles have been applied to the adhesive surface on the substrate the spherical units as well as the magnetic particles can be fixed to the surface of the adhesive by a very light rolling pressure applied by a soft sponge rubber roller. As an alternative, a clear plastic or other seal coating can be lightly sprayed over the iron or the magnetic particles as well as the transparent spheres to seal the surface of these materials. It is important that the clear plastic not effect the light transparency characteristics of the spheres so as to not hinder the light absorbing characteristics of the spheres. On the other hand the sealing coat will prevent moisture from oxidizing the magnetic particles which could cause rust and discoloration.

In combination with the shade substrate material which is provided in this invention, a suitable magnetic material is attached to the edge of the window frame 16. It is desirable that the magnetic material have the same width as the width of the magnetically permeable particle strip 44 which forms the edge seal. It is also to be noted that the width of the edge seal is usually designed to correspond with the overlap of the substrate material with the edge of the window frame. In this way, the inner edge of the particle strip 44 on the substrate 12 corresponds with the edge of the window frame 16.

The magnetic material 50 which can be provided and which will work suitably with the edge seal described herein can be elongated strip magnet material which is presently manufactured by Minnesota Mining and Manufacturing Corporation. This material has a magnetic surface and an adhesive backing with a cover strip covering the adhesive. By removing the adhesive cover strip the magnetic strip can be applied directly to the edge 19 of the window frame 16. It is to be understood that instead of using the magnetic strip as described herein a series of small individual magnets can be arranged in series along the edge 19 of the frame 16. It is desirable, however, to use the strip magnet material since a more secure edge seal can be provided which will prevent air movement from the cavity adjacent to the window pane 15.

It is to be understood that magnetic particles can be embedded along the edge of the substrate material and an iron metallic strip can be applied to the edge of the opening reversing the position described above. Also with this reversed arrangement the iron metallic strip can be omitted if the window frame or sash is fabricated from iron or steel.

OPERATION

In actual use, when it is desired to utilize solar energy which is passing through the glass 15 of the window W the solar energy absorbing shade 12 can be drawn downward from the shade cover box 26 so as to unroll from the roller 18 and completely cover the window opening. It is intended that the shade will be drawn at least the width of the seal strip 44 beyond the bottom edge of the frame 16. Once it has been extended the desired distance, the edges of the shade 12 are allowed to come into smooth contact with the magnetic strip 50 applied around the edges of the frame. Due to magnetic attraction between the magnetic strip 50 and the magnetically attracted particles 44, the edges of the shade 12 are substantially sealed. Thus, a dead air space is provided around all edges of the window frame 16 to prevent the cold air adjacent to the window pane 15 from moving into the interior of the room. With the solar energy striking the transparent spheres on the exterior surface of the shade substrate material 12, the solar energy is converted to heat energy as explained above so that the heat is transferred by conduction to the interior surface of the substrate where the air within the room is heated by convection and the objects by radiation.

It is a simple matter to release the magnetic edge seal by merely grasping the bottom edge 34 of the shade 12 and pulling out so that all edges are released from the magnetic strips. While holding the edges separated from the strip the shade is retracted into the cover 26.

It is to be understood that although throughout the description as provided in this application, reference is made to a sliding type window, the edge seal according to this invention can be applied to any other type of window desired as well as other types of openings such as doors, skylights or vents which are provided in the surfaces of a building. In addition, it is conceivable that the film material can be a clear plastic with or without the transparent spheres to allow the solar energy to pass directly into the interior of the room. The iron particles would be adhered to the adhesive material applied to the edge of the film with the particles embedded as explained previously. One of the most novel features of the present invention is the capability of the magnetic edge seal to provide an air tight seal without effecting in any way the solar heat transfer capability of the substrate material.

While a new and novel magnetic edge seal for solar collector film has been shown and described in detail, it is to be understood that this invention is not to be considered to be limited to the exact form disclosed and that changes in detail and construction may be made therein within the scope of this invention without departing from the spirit thereof.

What I claim is:

1. A magnetic edge seal for a flexible solar collector film material for forming a generally air-tight, heat insulating, reusable seal around the edges of a window opening in a surface of a building, the magnetic edge seal being provided to trap the air adjacent to said window opening to prevent it from entering the interior of said building while permitting solar energy to be converted to heat energy by said flexible film material so as to heat the air within said building, the magnetic edge seal comprising:

(a) a flexible film sheet material sized to overlap the edges of said window opening, said film material having a monolayer of transparent spheres adhered to the surface of said material facing said window opening;

(b) said flexible film material being arranged to be stored in the retracted position by being wrapped around a rotatably mounted roller positioned adjacent to the upper edge of said window opening;

(c) said rotatably mounted roller being positioned within an enclosed cover means positioned along the upper edge of said window opening whereby said edge is essentially sealed to prevent air flow;

(d) said film material being arranged to be extended downwardly across the said window opening by unrolling from said rotatably mounted roller whereby the sheet material completely covers said window opening and overlaps the edges of said opening;

(e) the edges of said sheet material having a continuous band of magnetically permeable particles adhered thereto; and (f) a continuous magnetic strip means applied along the edges of said window opening corresponding to the overlapping edges of said sheet material containing said magnetically permeable particles, said magnetically permeable particles being attracted to said magnetic strip means whereby an effective air-tight seal is provided around the outer edges of said film material whereby the air adjacent to the window opening is essentially enclosed and trapped to prevent movement to the interior of said building while allowing the solar energy collected on the surface of said flexible material to be converted to heat energy and conducted to the interior of said building.

* * * * *